United States Patent
Ritchie et al.

(10) Patent No.: US 10,493,428 B2
(45) Date of Patent: Dec. 3, 2019

(54) POROUS PARTICLES FOR LIQUID CHROMATOGRAPHY AND PROCESSES FOR THE PREPARATION THEREOF

(71) Applicant: THERMO ELECTRON MANUFACTURING LIMITED, Altrincham (GB)

(72) Inventors: Harald Ritchie, Runcorn (GB); Adham Ahmed, Liverpool (GB); Peter Myers, Liverpool (GB); Haifei Zhang, Liverpool (GB)

(73) Assignee: Thermo Electron Manufacturing Limited, Cambridge (GB)

( * ) Notice: Subject to any disclaimer, the term of this patent is extended or adjusted under 35 U.S.C. 154(b) by 1010 days.

(21) Appl. No.: 14/361,768

(22) PCT Filed: Nov. 22, 2012

(86) PCT No.: PCT/EP2012/073405
§ 371 (c)(1),
(2) Date: May 30, 2014

(87) PCT Pub. No.: WO2013/079396
PCT Pub. Date: Jun. 6, 2013

(65) Prior Publication Data
US 2014/0329673 A1    Nov. 6, 2014

(30) Foreign Application Priority Data
Dec. 1, 2011    (GB) .................................. 1120665.3

(51) Int. Cl.
*B01J 20/283*    (2006.01)
*C01B 33/18*    (2006.01)
(Continued)

(52) U.S. Cl.
CPC .......... *B01J 20/283* (2013.01); *B01J 20/103* (2013.01); *B01J 20/28004* (2013.01);
(Continued)

(58) Field of Classification Search
CPC ................ B01J 20/103; B01J 20/28054; B01J 20/28095; B01J 20/283; B01J 20/28004;
(Continued)

(56) References Cited

U.S. PATENT DOCUMENTS

| 2007/0189944 A1 | 8/2007 | Kirkland et al. |
| 2009/0297853 A1 | 12/2009 | Kirkland et al. |
| 2010/0051877 A1 | 3/2010 | Wei et al. |

FOREIGN PATENT DOCUMENTS

| CN | 101918312 A | 12/2010 |
| CN | 101961639 A | 2/2011 |

(Continued)

OTHER PUBLICATIONS

Lee, B., et al., "Synthesis of functionalized porous silicas via templating method as heavy metal ion adsorbents: the introduction of surface hydrophilicity onto the surface of adsorbents," Microporous and Mesoporous Materials, 50(1), 77-90, 2001.
(Continued)

*Primary Examiner* — James A Fiorito

(57) ABSTRACT

Superficially porous silica particles are provided as well as a one-pot process for making the superficially porous particles, the process comprising hydrolyzing and condensing a silica precursor comprising a functional group to form superficially porous particles, the superficially porous particles comprising silica microparticles having silica nanoparticles bound to the surface of the microparticles. The nanoparticles provide a porous outer layer on the microparticles. The superficially porous particles are useful as a
(Continued)

stationary phase in liquid chromatography and allow for fast mass transfer and separation of samples.

18 Claims, 17 Drawing Sheets

(51) Int. Cl.
    *B82Y 30/00*     (2011.01)
    *B01J 20/10*     (2006.01)
    *B01J 20/28*     (2006.01)
    *B01J 20/32*     (2006.01)
    *B01J 20/30*     (2006.01)

(52) U.S. Cl.
    CPC ..... *B01J 20/28007* (2013.01); *B01J 20/2808* (2013.01); *B01J 20/28016* (2013.01); *B01J 20/3078* (2013.01); *B01J 20/3085* (2013.01); *B01J 20/3295* (2013.01); *B82Y 30/00* (2013.01); *C01B 33/18* (2013.01); *C01P 2004/03* (2013.01); *C01P 2004/32* (2013.01); *C01P 2004/50* (2013.01); *C01P 2004/61* (2013.01); *C01P 2004/62* (2013.01); *C01P 2004/64* (2013.01); *C01P 2006/12* (2013.01); *C01P 2006/16* (2013.01)

(58) Field of Classification Search
    CPC ............ B01J 20/28007; B01J 20/28016; B01J 20/2808; B01J 20/3078; B01J 20/3085; B01J 20/3295; B82Y 30/00; C01B 33/18
    See application file for complete search history.

(56) References Cited

FOREIGN PATENT DOCUMENTS

| | | |
|---|---|---|
| CN | 102070148 A | 5/2011 |
| CN | 102272239 A | 12/2011 |
| EP | 2218500 A2 | 2/2012 |
| EP | 2598441 A1 | 6/2013 |
| WO | 2008150537 A2 | 12/2008 |
| WO | 2010061367 A2 | 6/2010 |
| WO | 2012018598 A1 | 7/2011 |
| WO | 2012018598 A1 | 2/2012 |

OTHER PUBLICATIONS

Lee, Y-G, et al., "Preparation of Highly Monodispersed Hybrid Silica Spheres Using a One-Step Sol-Gel Reaction in Aqueous Solution," Langmuir, 23(22), 10875-10878, 2007.

Liang et al., "Preparation, characterization of thiol-functionalized silica and application for sorption of Pb2+ and Cd2+," Colloids and Surfaces A: Physiochemical and Engineering Aspects, 349(1-3), 61-68, 2009.

Lu, Z., et al., "Formation Mechanism and Size Control in One-Pot Synthesis of Mercapto-Silica Colloidal Spheres," Langmuir, 27(7), 3372-3380, 2011.

Wu et al., "Effects of poly (vinyl alcohol) (PVA) content on preparation of novel thiol-functionalized mesoporous PVA/SiO2 composition nanofiber membranes and their application for adsorption of heavy metal ions from aqueous solution," Polymer, 51(26), 6203-6211, 2010.

Gritti et al., Physical properties and structure of fine core-shell particles used as packing materials for chromatography—Relationships between particle characteristics and column performance, J Chromatography A, 1217, 3819-3843, 2010.

POROUS PARTICLES FOR LIQUID CHROMATOGRAPHY AND PROCESSES FOR THE PREPARATION THEREOF

CROSS-REFERENCE TO RELATED APPLICATIONS

This application is the United States National Stage Application, under 35 USC 371, of International Application No. PCT/EP2012/073405 having an international filing date of Nov. 22, 2012 and designating the United States entitled "POROUS PARTICLES FOR LIQUID CHROMATOGRAPHY AND PROCESSES FOR THE PREPARATION THEREOF," which claims priority to GB Application No. 1120665.3, filed Dec. 1, 2011 entitled "POROUS PARTICLES FOR LIQUID CHROMATOGRAPHY AND PROCESSES FOR THE PREPARATION THEREOF," said applications incorporated by reference herein in their entireties.

FIELD OF THE INVENTION

This invention relates to the field of liquid chromatography. The invention further relates to porous particles for use as a stationary phase in packed liquid chromatography columns and to processes for preparing the same.

BACKGROUND OF THE INVENTION

Liquid chromatography (LC) columns have been extensively developed and are used routinely in both analytical and preparative chromatography. The separation in a chromatography column of a sample (also termed an analyte or solute) comprising a mixture of components is achieved by dissolving the sample in a liquid mobile phase and passing the mobile phase through a stationary phase typically packed within a tubular column, thereby causing the sample to separate into its components due to different partitioning between the mobile and stationary phases of the different components (i.e. the components have different partition coefficients). In liquid chromatography the stationary phase is typically in the form of a bed of particles packed within the column. This invention relates to such so-called packed columns.

Silica particles are commonly used as the stationary phase bed. Non-porous silica particles have a low sample capacity. Therefore, porous silica particles are commonly used which contain a network of pores to increase the surface area of the stationary phase and thus improve the capacity of the separation. The pores may be micro pores of less than 2 nm size, meso pores of 2 nm to 50 nm, or macro pores of greater than 50 nm. There has been a trend to reduce the size of the porous particles to improve the kinetics and resolution of the separation but this has been at the expense of increasing operating pressure. Porous particles can also be of excessive particle size distribution, which limits peak resolution. An alternative to fully porous silica particles in which the pores extend throughout the bulk of the particles has been to use so-called superficially porous particles, i.e. particles which are porous only at their surface. These enable a reasonable operating pressure to be used but still with a high resolution. They also offer the possibility of narrow particle size distributions. Superficially porous particles comprise a non-porous core having an outer porous shell. The porous shell results in short mass transfer distances and hence fast mass transfer and fast separation of samples. This is important for separation of large biomolecules such as proteins for example. Superficially porous particles are available commercially for HPLC in Poroshell™ columns from Agilent and Accucore™ columns from Thermo Scientific.

In a known procedure described in U.S. Pat. No. 3,505,785, superficially porous silica particles are prepared via multilayer coatings of silica colloids on the surface of non-porous silica microspheres acting as solid cores. Between two and thirty layers of colloid particles are described. This arrangement is induced by surface compatibility and in some cases surface pretreatment or modification of silica particles is necessary to induce interactions. This procedure is rather complex as the actual core and shell particles are prepared individually, followed by the core coating step. This procedure is also a lengthy process as each layer must be applied in a separate step and it is difficult to reproduce the final superficially porous particle size and size distribution.

Another method of preparing superficially porous silica is a coacervation method, described in J. J. Kirkland, F. A. Truszkowski, and C. H. Dilks Jr, G. S. Engel, *Journal of Chromatography A*, 890 (2000) 3-13, in which solid (i.e. non-porous) silica microspheres are coated by a coacervate of a polymer and silica sol, with the polymer being subsequently removed by heating at high temperature. However, this multi-stage technique has further disadvantages in that some core particles may not be coated leaving non-porous particles and some fully porous particles may be formed. Similarly, WO 2012/018598, published after the priority date of the present application, describes superficially porous particles formed by at least a two-step synthesis, wherein seeded silica particles or other particles were synthesized first and then the porous layers were produced on top of that.

The above techniques employ a porous layer on the surface of silica microparticles as the basis for superficially porous particles. Another method, described in US 2010/0051877 A, involves the pseudomorphic transformation of the surface of silica microparticles. During the process, the outer layer of the core particle is dissolved and re-precipitates to form a porous layer on the surface. However, the technique requires the core particles to be formed in a first reaction and then recovered in order to be processed in a further reaction to effect the pseudomorphic transformation of the surface to form the superficially porous particles. Thus, the technique has disadvantages in terms of excessive preparation time and reproducibility. The cores must be grown first, checked for quality control and then classified, which can take weeks. Then the shell has to be developed onto the core and grown to a given thickness. In so doing, the particle size changes and the particle size distribution broadens, possibly requiring further classification, which again may take weeks.

Conventionally, silica microparticles themselves are made using variations of the Stöber process (W. Stöber, A. Fink, E. Bohn, *Journal of Colloid and Interface Science*, Volume 26, Issue 1, 1968, p. 62-69) in which tetraethyl orthosilicate (TEOS) is added to an excess of water containing an alcohol such as ethanol and ammonia. Hydrolysis and condensation of the TEOS produces silica particles.

The use of mercapto-silanes as a precursor silica source instead of TEOS to produce porous, monodisperse silica microparticles has been described previously in Lee et al, *Langmuir*, 2007, 23 (22), pp 10875-10878; Lee et al, *Microporous and Mesoporous Materials*, 2001, 50 pp 77-90 and Lu et al, *Langmuir*, 2011, 27 (7), pp 3372-3380. Generally, it was found that increasing the concentration of the mercapto-silane increased the particle size. Increasing the base concentration on the other hand decreased the particle size. The silica microparticles reported in those studies are porous and mostly smooth, i.e. without any reported superficial porosity.

Against this background the present invention has been made.

SUMMARY OF THE INVENTION

According to an aspect of the present invention there is provided a one-pot process for making superficially porous silica particles, the process comprising hydrolyzing and condensing a silica precursor comprising a functional group to form superficially porous silica particles, the superficially porous silica particles comprising substantially non-porous silica microparticles having smaller silica nanoparticles bound to the surface of the microparticles.

According to another aspect of the present invention there is provided superficially porous silica obtainable by the process of the present invention.

According to still another aspect of the present invention there is provided superficially porous silica comprising silica microparticles having smaller silica nanoparticles thereon. Further features of the superficially porous silica are described hereinbelow.

The microparticles and nanoparticles upon first preparation comprise a functional group, preferably selected from mercapto (SH), amino ($NH_2$), hydroxyl (OH) or epoxy, most preferably mercapto. This functional group will, however, substantially be burnt away with other organic functionality upon sintering at 600 to 1250° C.

According to yet another aspect of the present invention there is provided the use of the superficially porous silica of the present invention as a stationary phase in liquid chromatography.

According to a further aspect of the present invention there is provided a stationary phase made from or comprising the superficially porous spheres-on-sphere particles. Advantageously, the particles exhibit improved performance in separation chemistry, such as liquid chromatography, especially HPLC. The stationary phase is suitable for separation of large bio-molecules.

Further preferred features of the invention are detailed in the claims.

The particles formed are superficially porous, having a porous shell. Each superficially porous particle provided by the invention has the form of a core sphere (i.e. the microparticle) with a coating of smaller spheres (i.e. the nanoparticles) on the surface of the core sphere. The superficially porous particles thus have a spheres-on-sphere morphology. The superficially porous particle is thus numerously referred to herein as spheres-on-sphere particle, e.g. spheres-on-sphere silica. Typically, the nanoparticles are substantially one layer thick on the microparticles, although multiple layers may be formed in some embodiments of the invention. As explained in more detail below, in the process of the present invention, the microparticles have been found to be formed first, followed by the controlled growth of nanoparticles on the surface of the microparticles, typically in a one-pot reaction synthesis. The microparticles and nanoparticles may conveniently be formed from the same precursor. Thus, the process of the present invention is fast and procedurally simple compared to the prior art processes.

The hydrolyzing and condensing of the silica precursor forms both the microparticles and the nanoparticles on the surface of the microparticles. It has been found that the process of hydrolyzing and condensing the precursor can be conveniently performed as a one-pot synthesis to form the microparticles surrounded by the surface-bound smaller nanoparticles. The ability to perform the process in a single pot is clearly advantageous and thus preferably the step of hydrolyzing and condensing the precursor is a one-pot synthesis. In this way, therefore the present invention reduces at least some of the problems of the prior art processes that require several labor-intensive steps by refining the method for making porous-shell particles in a single step. The process of this invention is different from reported processes as it involves simple reaction mixtures in order to achieve the desired spheres-on-sphere structure and control of the surface porosity.

Although the present invention provides a superficially porous silica and uses thereof as described herein and processes for making the same, the invention may be applicable to other semi-metal or metal oxides than silica. The metal oxide may be any metal oxide known to be capable of being formed as microparticles by hydrolysis and condensation of an appropriate precursor. Examples include, without limitation thereto, zinc (Zn) oxide, copper (Cu) oxide, aluminium (Al) oxide, titanium (Ti) oxide, zirconium (Zr) oxide, nickel (Ni) oxide and iron (Fe) oxide. It may be possible in certain embodiments to use silica particles as templates to prepare spheres-on-sphere metal oxides-on-silica particles (i.e. rather than pure metal oxides wherein the metal oxide is other than silica).

The microparticles at the core of the superficially porous particles generally have less porosity than their surface coating of nanoparticles. The microparticle cores are substantially non-porous (i.e. substantially solid), i.e. have little or no porosity.

The core microparticles preferably have a particle size in the range 1 μm to 100 μm, further preferably 1 μm to 50 μm, more preferably 1 μm to 20 μm, still more preferably 1 μm to 15 μm and most preferably 1 μm to 10 μm, especially 2 μm to 5 μm. Desirably, the size of the microparticles is at least 1 μm. Also desirably, the size of the microparticles is less than 10 μm. This microparticle size is that measured by the laser diffraction technique. In the examples herein, the microparticle sizes were measured by the laser diffraction technique using a Malvern Mastersizer 2000 analyser. The particle size volume distribution is generated, which is typically a substantially bell-shaped curve, wherein the average size referred to herein is the peak size in the distribution, i.e. the size at the highest point of the curve.

The nanoparticles preferably have a particle size in the range 1 nm to 1000 nm. More preferably, the nanoparticles have a particle size of at least 10 nm, still more preferably at least 20 nm, even more preferably 50 nm, yet even more preferably 100 nm and most preferably at least 200 nm. More preferably, the nanoparticles have a particle size of less than 1000 nm, still more preferably not greater than 800 nm, even more preferably not greater than 500 nm and most preferably not greater than 400 nm. Desirably, the nanoparticles have a particle size in the range 10 nm to 800 nm, more desirably 50 nm to 500 nm, more desirably 100 nm to 500 nm and most desirably 150 nm to 400 nm and 200 nm to 400 nm, for example about 200 nm. This nanoparticle size is that measured by the dynamic laser scattering (DLS) technique. In the examples herein, the nanoparticle sizes were measured using a Viscotek 802 DLS analyser. The primary result from DLS, used herein, is the average value from the intensity distribution (called the Z average) and the polydispersity index (PDI) may be used to describe the distribution width. The particle size distribution generated is typically a substantially bell-shaped curve in the present case, and the average size is the peak size in the distribution, i.e. the highest point of the curve.

The superficially porous, i.e. spheres-on-sphere, particles preferably have a particle size measured by the laser diffraction method in the range 1 μm to 100 μm, further preferably 1 μm to 50 μm, more preferably 1 μm to 20 μm, still more preferably 1 μm to 15 μm and most preferably 1 μm to 10 μm, especially 2 μm to 5 μm. The range of particle sizes is also relevant. Preferably, the superficially porous particles have $D_{90}/D_{10}$ not greater than 3.5, more preferably not greater than 3.0, even more preferably not greater than 2.0, still more preferably not greater than 1.6 and most preferably not greater than 1.4, wherein $D_{90}$ is the diameter of the $90^{th}$ percentile and $D_{10}$ is the diameter of the $10^{th}$ percentile in the volume distribution measured by the laser diffraction technique. This particle size is that measured by the laser diffraction technique as described above. In the examples herein, the sizes of the superficially porous particles were measured using a Malvern Mastersizer 2000 analyser. The particle size may be controllable by varying the process conditions as described in more detail below.

The smaller nanoparticles are bound to the surface of the microparticles. The nanoparticles form a porous layer on the surface of the microparticles since the spaces or interstices between the nanoparticles provide pores. That is, superficial pores are generated by the nanoparticles packing on the surface. The pores are typically less than 5 nm pore size and especially are micropores, i.e. less than 2 nm pore size. The smaller nanoparticles preferably form a porous shell surrounding the microparticles. The nanoparticles preferably fully cover the microparticles. The shell of nanoparticles is of low thickness. The shell is preferably substantially only one layer of nanoparticles thick. The process of preparing the particles can be performed so as to provide a single layer (monolayer) of the nanoparticles on the microparticles and tends to do so based on an initial charge of the precursor. It is possible to form a nanoparticle shell in the one-pot synthesis comprising two layers and perhaps even three or more layers if desired. It has been found that addition of a further amount of the precursor after the microparticle growth stage, i.e. during the nanoparticle growth stage as explained below, may provide two or more layers of nanoparticles. The stability of the porous nanoparticle surface layers may be improved by calcining the particles. The particles having a monolayer of nanoparticles have been found to be the most stable however. The low thickness of the porous layer of even a monolayer has been found to be more than adequate for efficient chromatographic separation. The low thickness of the porous layer means that the mass transfer distances are short and thus fast mass transfer and fast sample separation are possible.

The superficially porous particles typically have a small pore size due to the packing of the small nanoparticles on the surface. The pore size of the superficially porous particles calculated by non-local density functional theory (DFT) is preferably less than 5 nm, more preferably less than 3 nm and still more preferably less than 2 nm.

The porosity of the superficially porous particles is preferably in the range 30 to 70%.

The surface area of the superficially porous particles after a calcination (i.e. at least 550° C.) is preferably, in order of increasing preference, at least 10 m²/g, at least 25 m²/g, at least 50 m²/g, at least 75 m²/g, at least 100 m²/g, at least 150 m²/g, or at least 175 m²/g. Most preferably, the surface area of the superficially porous particles is at least 200 m²/g. Examples have typically been found to have surface areas in the range 10 to 250 m²/g.

The superficially porous particles can be subjected to thermal treatment, i.e. calcination, to give improved mechanical stability. Another advantage of the invention is that the spheres-on-sphere particles are robust to high temperatures, e.g. up to 1250° C., without any significant distortion to the spheres-on-sphere morphology. The particles may therefore be calcined without significant detriment to the spheres-on sphere morphology. Preferably, the superficially porous particles are calcined before use as a stationary phase for chromatography.

The present invention provides superficially porous particles which are suitable for use as a stationary phase bed in liquid chromatography (LC). The particles may be easily packed into LC columns. The LC may be normal phase (NP) or reverse phase (RP) LC. The superficially porous particles are preferably functionalized before use as a RP stationary phase. The LC may be under isocratic or gradient elution conditions. For reverse phase LC, preferably gradient elution conditions are used. The LC may be high performance liquid chromatography (HPLC), ultra-high performance liquid chromatography (UHPLC), fast protein liquid chromatography (FPLC) or another LC technique. The LC may usefully be LC of large biomolecules, such as proteins for example. The presence of the porous shells and nonporous cores can provide excellent mass transfer properties, resulting in fast mass transfer and thus fast separation of large bio-molecules such as proteins. The invention thus reduces the problems in the prior art of slow separation of large biomolecules such as proteins. The superficially porous particles can also reduce problems relating to high back pressures in HPLC.

The process preferably uses a silica precursor (where herein reference to precursor also includes the case of using a mixture of precursors) containing a mercapto group (herein termed a mercapto-silica precursor). However, the process may use a precursor containing an amino group (herein termed e.g. an amino-silica precursor), and/or a precursor containing a hydroxyl group (herein termed e.g. an hydroxy-silica precursor), and/or a precursor containing an epoxy group (herein termed e.g. an epoxy-silica precursor). Thus, the functional group of the precursor is preferably selected from mercapto, amino, hydroxyl and epoxy, most preferably mercapto. For convenience, the present description will hereafter refer primarily to the case of the most preferred precursor, which contains a mercapto group, and more specifically the case of a mercapto-silica precursor, but it should be understood that, unless the context requires otherwise, a reference to a mercapto-silica precursor may be substituted by a reference to the corresponding amino-silica precursor, hydroxyl-silica precursor, or epoxy-silica precursor. In the case of forming superficially porous particles other than silica, e.g. of another metal oxide, herein the mercapto-silica precursor etc. can be a metal oxide precursor containing one of these functional groups.

The mercapto-silica precursor is preferably a mercapto-silane. More preferably, the mercapto-silica precursor contains an alkyl-mercapto group, preferably a ($C_1$-$C_4$ alkyl)-mercapto, e.g. 3-mercapto-propyl. The mercapto-silane is preferably of the following general formula:

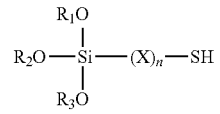

Where R1, R2, R3 are independently H, unsubstituted or substituted alkyl (preferably methyl or ethyl); X is unsubstituted or substituted alkyl (preferably $C_1$-$C_4$ alkyl, especially propyl). An especially preferred mercapto-silica precursor as the silica source is 3-mercapto-propyl-trimethoxysilane (MPTMS). Other suitable precursors may include 3-mercapto-propyl-triethoxy-silane (MPTES). As described above, the silica precursor may be an amino-silica precursor, hydroxyl-silica precursor, or an epoxy-silica precursor, wherein in the formula above the —SH group is replaced with an —$NH_2$ (amino) group, or —OH group, or an epoxy group. Furthermore the Si may be replaced by M, where M is a metal, for example, from the group consisting of Zn, Cu, Al, Ti, Zr, Ni and Fe.

The amount of mercapto-silica precursor may influence the size of the final superficially porous particles. The superficially porous particles typically increase with increasing amount of mercapto-silica precursor in the initial, microparticle growth stage. It has been found that addition of a further amount of the mercapto-silica precursor after the microparticle growth stage, i.e. during the nanoparticle growth stage as explained below, may provide increased nanoparticle formation, e.g. forming two or more layers of nanoparticles.

The amount of mercapto-silica precursor (meaning total amount of mercapto-silica precursor where more than one mercapto-silica precursor is used) is preferably in the range from 0.05 to 3 weight parts (wt parts). The amount of mercapto-silica precursor in the starting mixture is preferably at least 0.05 wt parts, more preferably at least 0.1 wt parts, still more preferably at least 0.3 wt parts, and most preferably at least 0.5 wt parts. The amount of mercapto-silica precursor in the starting mixture is preferably not greater than 3 wt parts.

The mercapto-silica precursor is preferably used as the sole silica source. This is advantageous for the simplicity of the reaction mixture and because a silica precursor having a mercapto group has been found to provide an effective spheres-on-sphere morphology. However, for example to produce variations in the silica particle morphology, the mercapto-silica precursor may be used together with an amount of one or more other silica sources (i.e. not having a mercapto group or other functional groups as specified herein), although this has been found to typically reduce the efficiency of formation of spheres-on-sphere particles. Examples of suitable additional silica sources include tetraethyl orthosilicate (TEOS) and tetramethyl orthosilicate (TMOS) as well as other silica sources known to form silica by hydrolysis and condensation. Preferably, the mercapto-silica precursor (including also the case of a mixture of mercapto-silica precursors) is preferably used as the sole silica source, or any other silica precursor, where present, is present in an amount of less than 10% and more preferably less than 5% by weight of the total amount of silica precursor.

The hydrolysis is preferably base catalyzed. Accordingly, the process preferably comprises including an amount of a base in the reaction medium or mixture to provide an alkaline pH. The pH of the initially basic reaction medium gradually increases as the reaction proceeds but the starting pH can be controlled by the amount of base present. The starting pH of the reaction medium (i.e. at the start of the hydrolysis and condensation reaction) is preferably 9 or higher and more preferably is 9.5 or higher. The starting pH is preferably 11 or lower and more preferably is 10.5 or lower. A preferred starting pH is in the range from 9.0 to 11.0 and the most preferred starting pH is in the range from 9.5 to 10.5, for example 9.6, 9.7, 9.8, 9.9, 10.0, 10.1, 10.2, 10.3, or 10.4.

A preferred base is ammonium hydroxide although others bases may be used, e.g. sodium hydroxide. The amount of ammonium hydroxide is preferably equivalent to at least 0.1 wt parts, more preferably at least 0.2 wt parts, still more preferably at least 0.3 wt parts, and most preferably at least 0.4 wt parts of a 30% $NH_3$ standard grade solution. The amount of ammonium hydroxide is preferably equivalent to 1 wt part or less of a 30% $NH_3$ standard grade solution.

The medium for the hydrolysis and condensation reaction includes water. Water is preferably present in an amount of at least 3 wt parts, more preferably at least 5 wt parts, and still more preferably at least 7 wt parts. Preferably not greater than 15 wt parts and more preferably not greater than 10 wt parts water are used. Preferred ranges therefore include 3 to 15 wt parts and 5 to 10 wt parts water.

In addition to the water, the process preferably is performed in the presence of an organic solvent (which herein also includes the case of using a mixture of organic solvents), preferably an alcohol (which herein also includes a mixture of alcohols), especially comprising a small alcohol, methanol being the most preferred alcohol. The presence of the alcohol has been found to be important in the formation of surface bound nanoparticles in the superficially porous final particles. This contrasts to the prior art studies described above of forming silica using a mercapto-silane, which have hydrolysed the mercapto-silane under purely aqueous conditions (Lu et al, Langmuir, 2011, 27 (7), pp 3372-3380). The large silica particles formed were observed in that case without any silica nanoparticle formation on their surface (i.e. only smooth silica microparticles were formed).

The alcohol (meaning total amount of alcohol where more than one alcohol is used) is preferably present in an amount of at least 3 wt parts, more preferably at least 5 wt parts, and still more preferably at least 8 wt parts. Preferably not greater than 15 wt parts and more preferably not greater than 12 wt parts alcohol are used. Preferred ranges therefore include 3 to 15 wt parts and 5 to 12 wt parts alcohol.

Thus, the medium for the hydrolysis of the mercapto-silica precursor is preferably a mixture of at least one organic solvent, preferably methanol, and water. The total wt parts of the solvent and water in the reaction is preferably at least 6 wt parts, more preferably at least 8 wt parts, still more preferably at least 10 wt parts and most preferably at least 12 wt parts. Preferably, the total wt parts of the solvent in the reaction is not greater than 30 wt parts, more preferably not greater than 25 wt parts and still more preferably not greater than 20 wt parts. The ratio (by volume) of organic solvent (preferably methanol):water in the solvent mixture is preferably in the range 3:1 to 1:3, more preferably 2:1 to 1:2. The ratio (by volume) of organic solvent (preferably methanol):water in the mixture is especially at least 1:1, that is the amount of organic solvent is preferably equal to or greater than the amount of water, with even more preferable ratios being in the ranges 3:1 to 1:1 and 2:1 to 1:1.

The hydrolysis and condensation reaction is preferably performed in the presence of a surfactant (which herein also includes the case of a mixture of surfactants). The surfactant is preferably water-soluble. The surfactant preferably forms micelles under the hydrolysis and condensation conditions of the process. Without the invention being bound by a theory, the surfactant appears to have a stabilizing role on the formation of nanoparticles of the surface of the microparticles. The surfactant may be ionic (cationic or anionic or zwitterionic) or non-ionic, but preferably is ionic and more preferably cationic. Preferred surfactants are cationic, quaternary ammonium surfactants, more preferably with either bromide or chloride counter-ions, with more preferred examples being of a formula: $(R_4)(R_5)(R_6)(R_7)(N)^+X^-$, where each of $R_4$, $R_5$, $R_6$, $R_7$ is independently selected from H, alkyl, alkenyl, alkynyl, benzyl and aryl (especially alkyl), each of which may unsubstituted or substituted (preferably each $R_4$, $R_5$, $R_6$, is independently an alkyl group and $R_7$ is an alkyl or benzyl group (especially an alkyl group)) and X is Br or Cl. Especially, at least one of $R_4$, $R_5$, $R_6$, $R_7$ is a $C_{8-20}$ alkyl group (unsubstituted or substituted). More especially, each $R_4$, $R_5$, $R_6$, is independently a $C_{1-2}$ alkyl group (especially methyl) and $R_7$ is a $C_{8-20}$ alkyl group. Especially preferred examples are alkyltrimethylammonium bromide or chloride, more especially ($C_{8-20}$alkyl)trimethylammonium bromide or chloride, with lauryl ($C_{12}$), myristyl ($C_{14}$), and cetyl ($C_{16}$) and stearyl ($C_{18}$) and didecyl ($C_{20}$) analogues most preferred, with cetyltrimethylammonium bromide (CTAB) and/or cetyltrimethylammonium chloride (CTAC) being especially good examples. Other examples could include, for example, benzalkonium chloride or bromide, also known as a mixture of alkyldimethylbenzylammonium chloride or bromide, having even-numbered alkyl chain lengths, e.g. $C_8$ to $C_{18}$.

The amount of surfactant present (meaning total amount of surfactant where more than one surfactant is used) is preferably in the range from 0.01 wt parts to 1 wt parts. The amount of surfactant is preferably at least 0.02 wt parts, more preferably at least 0.05 wt parts and most preferably at least 0.1 wt parts. The amount of surfactant is preferably not greater than 3 wt parts or, more preferably, 2 wt parts.

The reaction is preferably performed in the presence of a colloid stabilizer (which herein also includes the case of a mixture of colloid stabilizers), more preferably a polymeric colloid stabilizer, especially a hydrophilic polymer, which has been found to help stabilize the colloids during the synthesis of the silica particles and provide a degree of control over particle size and the size distribution. Preferred examples of hydrophilic polymer include poly(vinyl alcohol) (PVA) and poly(vinyl pyrrolidone) (PVP), poly(ethylene glycol) (PEG), and hydroxypropyl methylcellulose (HPMC), with PVA and PVP being more preferred. Preferably the (weight average) molecular weight, $M_w$, of the polymer is about 5,000 to 15,000, more preferably about 8,000 to 10,000.

The amount of colloid stabilizer such as hydrophilic polymer (meaning total amount of stabilizer where more than one is used) is preferably in the range from 0.05 wt parts to 3 wt parts. The amount of stabilizer such as hydrophilic polymer is preferably at least 0.1 wt parts and more preferably at least 0.2 wt parts. The amount of stabilizer is preferably not greater than 3 wt parts, more preferably not greater than 2 wt parts and most preferably not greater than 1 wt part.

In view of the above, a preferred system or scheme for preparing the spheres-on-sphere particles comprises using the following components in the manners described: alkaline conditions, a solvent comprising methanol and water, a mercapto silica precursor (especially MPTMS), a surfactant (especially CTAB or CTAC), and a hydrophilic polymer (especially PVA).

The basic pH medium is preferably prepared and the precursor is then preferably added to the medium containing the base. The other preferable reagents, such as the colloid stabilizer (e.g. hydrophilic polymer) and surfactant are preferably included in and mixed with the basic medium prior to addition of the precursor.

The precursor is preferably added to the other ingredients incrementally, i.e. over a period of time, for example a period ranging from 1 second to 100 seconds. A time of about 30 seconds may typically be used.

The reaction ingredients are preferably stirred together to ensure efficient spheres-on-sphere particle formation. The hydrolysis and condensation can conveniently be conducted at about room temperature for example.

The reaction is preferably allowed to proceed following the first addition of precursor for a period of at least 30 minutes, more preferably at least 45 minutes and most preferably at least 60 minutes. The process has been found, at least in some embodiments, to proceed in two stages. In a first stage, referred to herein as the microparticle growth stage, the particle growth is predominantly growth of the microparticles. In a second stage, following the first stage, referred to herein as the nanoparticle growth stage, the particle growth is predominantly growth of the nanoparticles. The nanoparticle growth stage is typically of longer duration than the microparticle growth stage. A period of about 20 minutes has been found to be required for the microparticle growth stage to form the core microparticles, followed by a longer period for the nanoparticle growth stage required for an efficient formation of the nanoparticles on the surface of the microparticles.

The superficially porous particles are preferred recovered from solution and calcined before use, e.g. as a stationary phase for chromatography. The preferred calcining condition comprises heating to a temperature in the range 550 to 1250° C., preferably in air. An example condition is to heat, e.g. in air, to 550-1250° C. (e.g. at 1° C./min), hold for a period, e.g. 300 min, in the temperature range of 550-1250° C. and then cool down to room temperature, e.g. at 5° C./min. More preferably, the superficially porous particles are calcined by heating at a temperature not exceeding 1000° C., e.g. at a temperature in the range 550-1000° C. The calcined particles may be easily packed into LC columns for use as a stationary phase.

DETAILED DESCRIPTION OF THE INVENTION

Figure 1A:
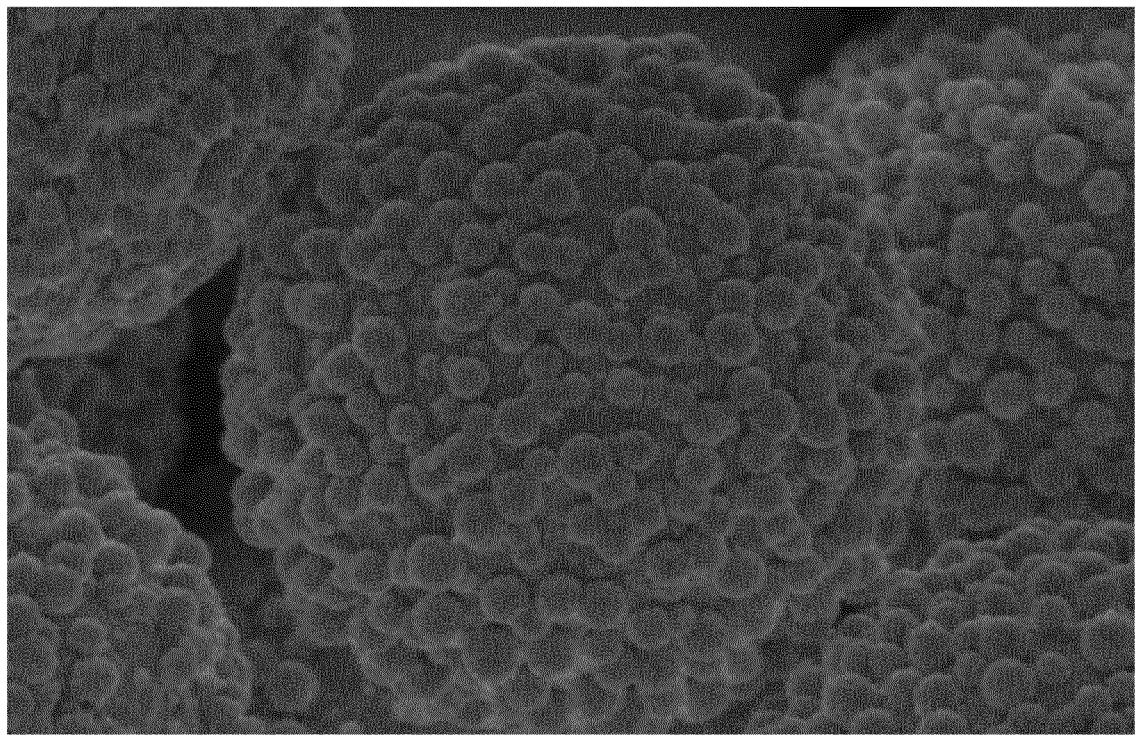
FIG. 1A shows an SEM image of spheres-on-sphere silica particles synthesized according to the present invention.

In order to further understand the invention, but without limiting the scope thereof, various examples are now described with reference to the accompanying drawings. Whilst the following are only examples of the invention, it will be apparent that many features evident from the examples could be generalized, such as the preferred order of addition of reagents for instance.

Material Characterization

SEM

Morphologies of the silica microparticles were observed by a Hitachi-S4800 scanning electron microscope (SEM). One drop of the suspension in ethanol was deposited on a SEM stud and allowed to dry overnight. The samples were then coated with gold using a sputter-coater (EMITECH K550X) for 3 min at 30 mA for SEM imaging. To observe the particles using a STEM detector, one drop of the suspensions was deposited on a TEM grid and then observed directly after drying overnight.

Particle Size

The silica microparticles were measured using a Malvern (Malvern, Worcestershire, UK) Mastersizer 2000 equipped with dispersion unit. The analysis was performed using He—Ne laser in conjunction with blue light source to provide superior sensitivity across a wide size range. The angular intensity of scattered light is detected by forward and backscatter detection for enhanced sizing performance. The scattering of the particles is accurately predicted by the Mie scattering model. The measurements were carried out six times to obtain the average particle size distribution at 2000 rpm dispersion. The silica nanoparticles as suspensions in water were characterized by dynamic laser scattering (DLS) using Viscotek Model 802 DLS system to obtain hydrated particle sizes. The measurements were carried out in a quartz cell at room temperature and the average particle size distribution was obtained after six measurements.

pH

The pH of the solution mixture was continuously measured for a period of at least 2 hours at regular intervals.

Surface Area and Pore Volume

The Brunauer-Emmett-Teller (BET) surface area and pore volume by $N_2$ sorption at 77K were measured using a Micromeritics ASAP 2020 adsorption analyzer. Pore size distributions were calculated from Barrett-Joyner-Halenda (BJH) desorption data and non-local density functional theory (DFT) data. Samples were degassed for 10 h at 120° C. before analysis.

HPLC

For HPLC characterization of the column, an Agilent 1200 series high performance liquid chromatography system was used, comprising a vacuum degasser, quaternary pump, ALS auto-sampler, heated column compartment and UV-Vis detector. Data analysis was performed using Agilent Chemstation software, version B.02.01 (Agilent Technologies, USA).

Example 1—Preparation of Spheres-on-Sphere Silica

The following chemicals and reagents were used: (3-Mercaptopropyl)trimethoxysilane (MPTMS) (95%), cetyltrimethylammonium bromide (CTAB) (≥98%), ammonium hydroxide solution (reagent grade, 28-30% $NH_3$ basis), hydrophilic polymers: poly(vinyl alcohol) (PVA) (Mw 10K), poly(vinyl pyrrolidone) (PVP) (Mw 8K), hydroxypropyl methylcellulose (HPMC) (Mw 10K), and methanol (analytical grade). Trifluoroacetic acid (TFA) and Chloro (dimethyl)octylsilane (C8) were purchased from Sigma-Aldrich and used as received. Distilled water was used throughout the experiment.

The hydrophilic polymer (0.25 g) and CTAB (0.1 g) were dissolved in 5 g water. To this solution, 8 mL methanol was added while stirring. The purchased ammonium hydroxide solution (0.5 g) was diluted by mixing with 2 mL water and then 2 mL of the diluted ammonia solution was added into the reaction mixture. After stirring for 15 min, 0.5 mL MPTMS was added drop-wise over a 30 seconds period. The concentrations of polymer and surfactant in these examples were referred to the volume of water. The reaction was stirred for 24 hours at room temperature. The resulted silica particles were collected by centrifuging the suspensions. These collected silica particles were calcined in a furnace (Carbolite, CWF1500) to remove the organic template and other organic components such as the functional groups. The calcining condition: heat at 1° C./min in air to (550-1250)° C., hold for 300 min, and then cool down to room temperature at 5° C./min.

Figure 1B:
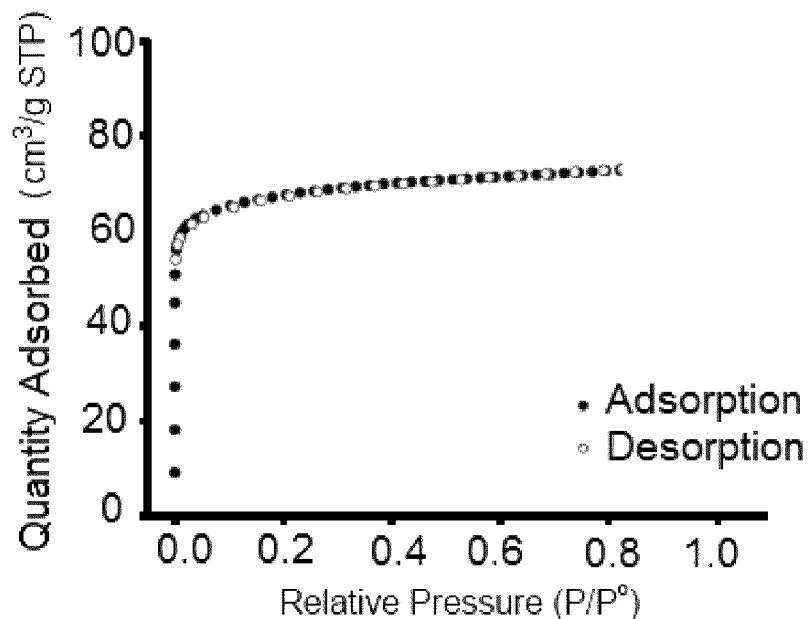
FIG. 1B shows the $N_2$ isotherm for the silica particles shown in FIG. 1A.
Figure 1C:
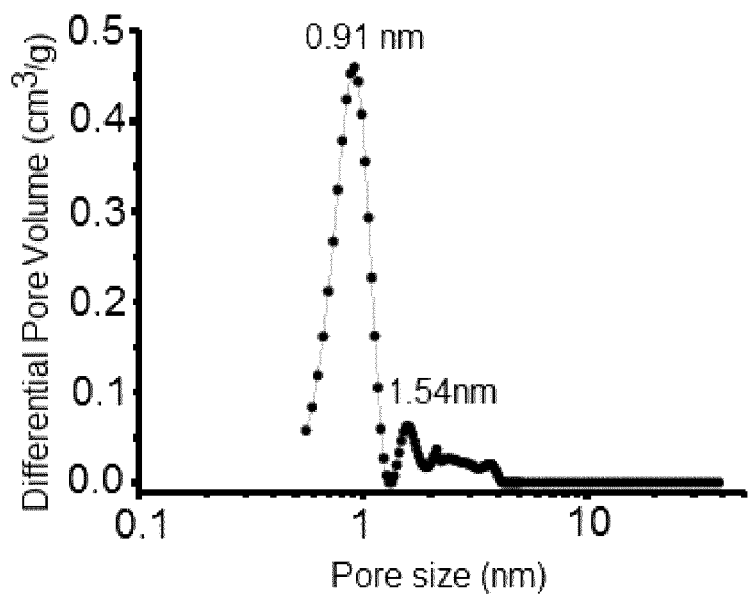
FIG. 1C shows the pore size distribution for the silica particles shown in FIG. 1A.

When the MPTMS was added, spheres-on-sphere particles were formed in a one-pot synthesis. Using PVA as the hydrophilic polymer, the particle size distribution of the spheres-on-sphere particles was in the range of 2.5-12.9 μm and peaked at 5.67 μm. The values of $d_{0.1}$ and $d_{0.9}$ were 3.21 μm and 9.89 μm respectively. The resultant SEM image of the spheres-on-sphere particles is shown in FIG. 1A. Large silica microspheres were seen to be coated with silica nanoparticles ranging 200-400 nm in size, which were orderly arranged on the surface of the microspheres. The BET surface area after calcination was 204 m$^2$/g. The N$_2$ isotherm showed a type I isotherm (shown in FIG. 1B) which is normally obtained for microporous silica. Due to the BJH model limitations it is unable to calculate pores less than 2 nm. Thus, for microporous materials, non-local density functional theory (DFT) method should be used. The pore size distribution calculated from the DFT data showed micropores peaks at 0.91 and 1.51 nm (FIG. 10).

Example 2—Growth Study

Figure 2:
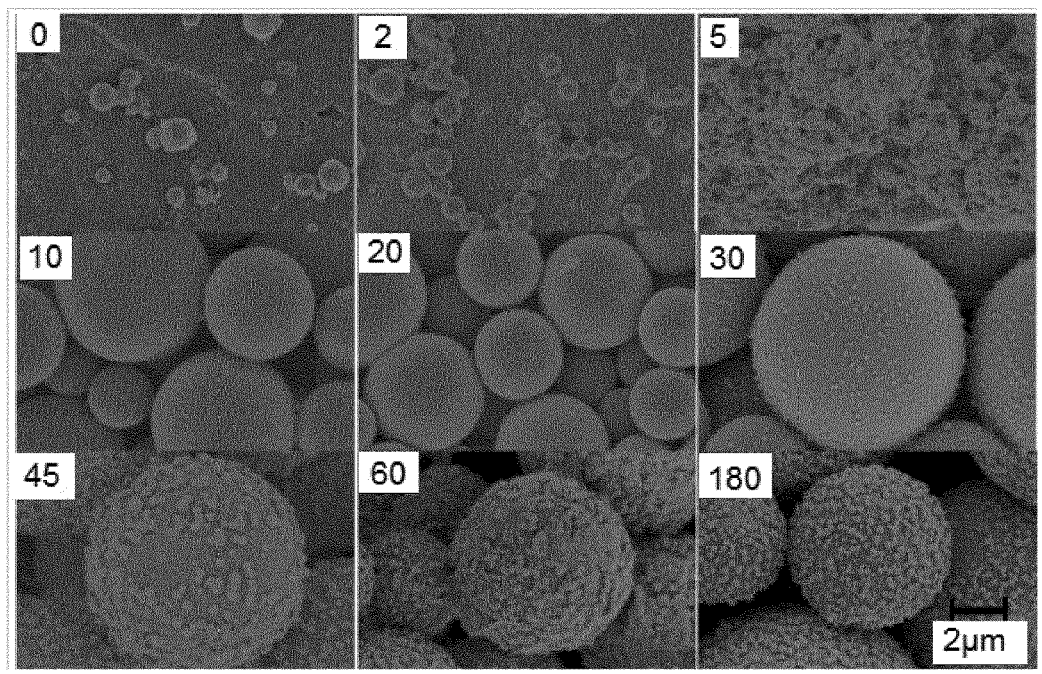
FIG. 2 shows SEM images of the growth of spheres-on-sphere silica particles over time (in minutes).
Figure 3:
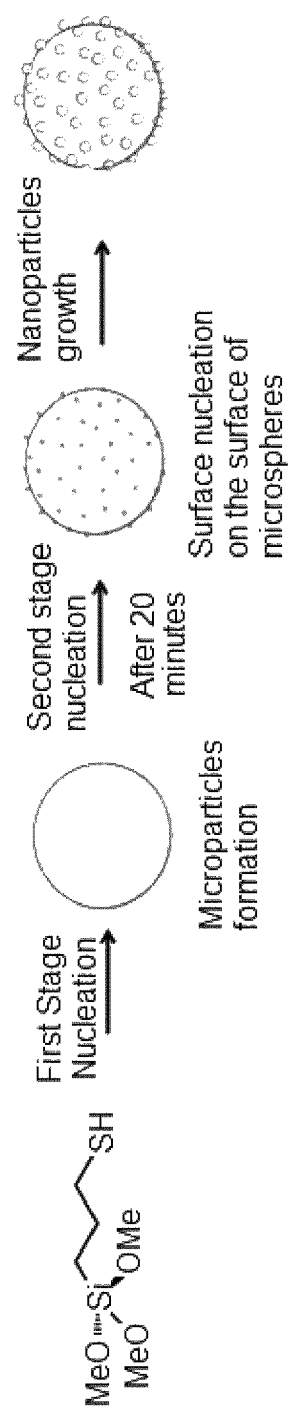
FIG. 3 shows schematically an apparent synthesis mechanism according to the present invention.

A time study was conducted in order to see how the spheres-on-sphere particles grow during the one-pot synthesis. This was done by examining samples at regular time intervals. To obtain each sample, it was centrifuged at 13000 rpm to ensure complete extraction of the silica particles from the suspension, which were then thoroughly washed with water to remove any unreacted silica precursor. The obtained samples were analysed by SEM and the images are shown in FIG. 2 (the number on each image indicates the time in minutes after the start of the reaction when the sample was extracted). It appears that there are two stages of nucleation occurring. The first stage comprises the growth of silica microparticles and lasts for a period of about 20 minutes. Then, a second stage of nucleation occurs on the surface of the formed microparticles. At 180 minutes, it appeared that the spheres-on-sphere particles have fully formed. The reaction was monitored for 24 hours but no further significant growth was seen during this time. Without the scope of the invention being bound by this theory, an illustration of the apparent synthesis is shown in FIG. 3.

Example 3—pH Study

The pH of the solution was about 9.9 before the start of the hydrolysis and was just below 10.5 by the time the process was complete (150 mins). In comparison with TEOS in conventional processes, the present pH pattern with time was rather different since usually a pH decrease is observed due to the formation of silicic acid. Without being bound by any theory, it appears that this behaviour may be caused by the thiol group as it deprotonates under basic conditions.

Figure 4:
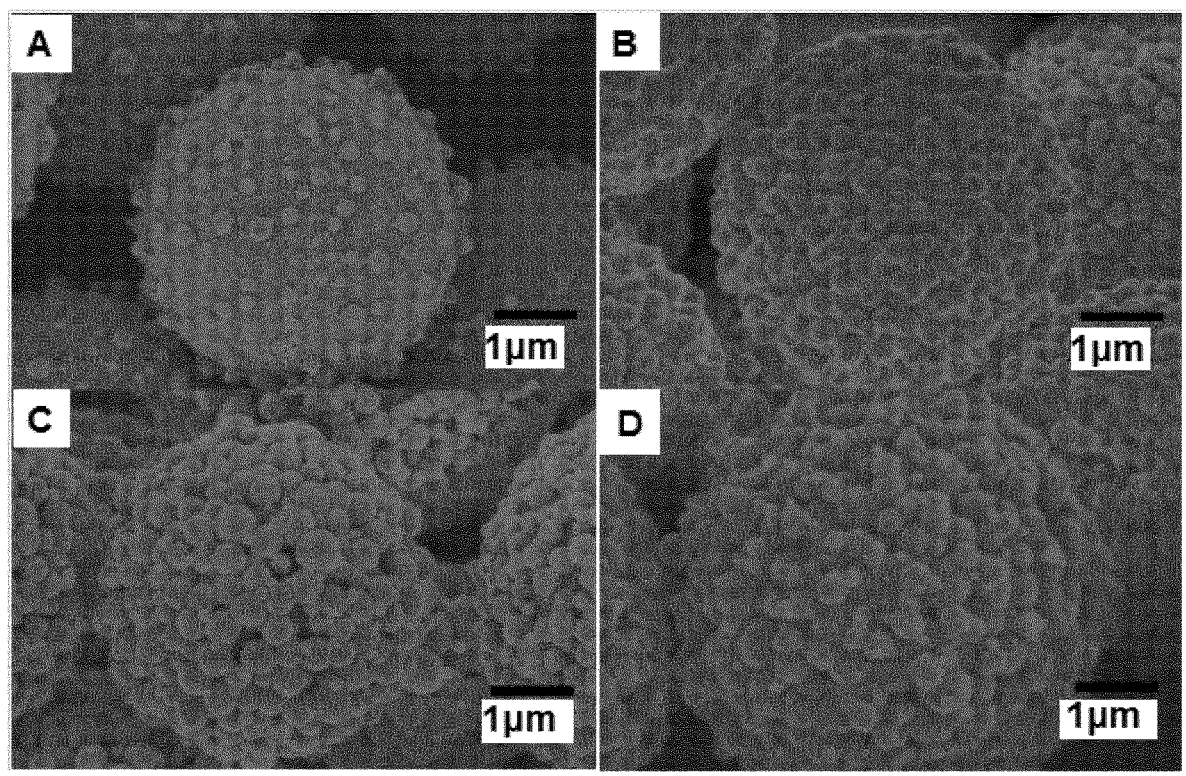
FIG. 4 shows SEM images of spheres-on-sphere silica particles synthesized according to the present invention using different $NH_3$ concentrations.

The reaction conditions described above involved the use of 2 ml of the 25% wt diluted NH$_3$ solution during the synthesis and this resulted in the formation of orderly densely arranged nanoparticles of 200-400 nm size on the surface of the microparticles. The pH effect was further investigated using more diluted NH$_3$ solutions of 5% wt and 1% wt. In these cases, the SEM images (see FIG. 4 images C and D) showed that the nanoparticles increased in size with denser packing with reduced NH$_3$ concentration. For comparison, the SEM of the above example using the 25% wt NH$_3$ solution is shown in image B of FIG. 4. It appears that the silica nanoparticles are strongly fused or aggregated on the surface with the addition of 1% wt NH$_3$. The precipitation of particles proceeds more slowly in the more dilute cases, which leads to larger particles forming. This has an effect on particle size distribution and larger particles are formed. After calcination, the samples made using the more dilute NH$_3$ solutions also had lower surface areas (30 m$^2$/g and 19 m$^2$/g). The use of undiluted (i.e. 100% wt) NH$_3$ solution yielded reduced coverage of nanoparticles as shown in image A of FIG. 4.

Example 4—Particle Stability

Figure 5:
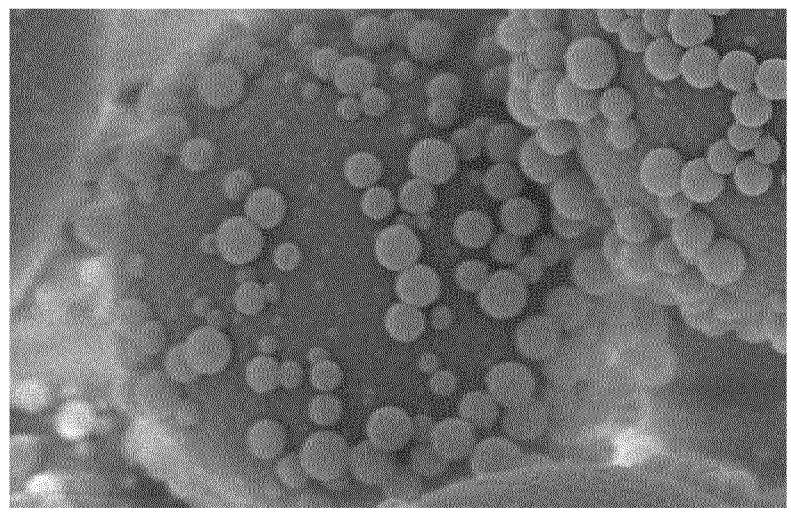
FIG. 5 shows SEM images of spheres-on-sphere silica particles according to the present invention after ultrasonication.

The spheres-on-sphere particles were ultra-sonicated to observe the stability of the nanoparticles on the surface. The particles were ultra-sonicated at 140 W for 8 hours in water and it was observed that some nanoparticles had come off the surface of the microspheres, but not all of them, as revealed by SEM (see FIG. 5). This indicates that the nanoparticles are strongly attached to the surface as the surface remains relatively densely covered even after such a strong sonication.

Example 5—Double-Coating Layer

The particles obtained using the method described above resulted in a single-coating layer of nanoparticles on the surface. However, by adding further MPTMS during the nanoparticle growth stage (i.e. after 20 minutes), at 30 minutes, without removing the pre-formed microspheres, more nanoparticles were seen to grow on the surface. With increasing MPTMS amount in solution, the spacing between the nanoparticles decreased and much denser coating was formed. This process enabled the formation of a double-coating layer when a further 0.5 ml of MPTMS was added at 30 minutes, although the double-coating layer was observed to come off with washing so was not apparently as stable as the single layer, but stability may be improved with calcination.

Example 6—Controlling the Particle Formation

The effect of the surfactant on the spheres-on-sphere morphology was significant. By varying the surfactant concentration the size of the nanoparticles on the surface were reduced. In contrast to the CTAB amount in the Example 1 above (2% wv based on the 5 mL added water volume), a high concentration of CTAB (10% wv) contributed to the formation of smaller nanoparticles on the surface at around 128 nm and the microspheres size remained unchanged. The nature of the surfactant counter-ion was investigated by replacing the CTAB surfactant with the same surfactant cation but with chloride counter-ion (CTAC). The use of the different surfactant counter-ion during the reaction resulted in the same spheres-on-sphere structure.

Controlling the uniformity of the stationary phase particles is very important for chromatographic applications. Increasing the PVA concentration by a factor of 2 improved the size distribution of the spheres-on-sphere particles to $d_{0.1}$-$d_{0.9}$=2.68-6.81 μm. Another hydrophilic polymer, poly(vinyl pyrrolidone) (PVP) (Mw 8K), was introduced into the reaction in place of the PVA and this also yielded spheres-on-sphere structures, as did another hydrophilic polymer, hydroxypropyl methylcellulose (HPMC) (Mw 10K). The polymer concentration of 5% wv (based on the 5 mL of added water) was kept the same for the samples prepared using the other polymers. The particle size distribution using PVP was better than with the PVA polymer. With PVP a smaller and narrower particle size distribution around 2.73 μm was achieved with $d_{0.1}$-$d_{0.9}$=1.54-4.76 μm (compared to the cases above of PVA (5% wv) $d_{0.1}$-$d_{0.9}$=3.21-9.89 μm, PVA (10% wv) $d_{0.1}$-$d_{0.9}$=2.68-6.81 μm). The surface nanoparticles were also smaller with the PVP at 75 nm.

HPLC

Example 7—Column Packing and Characterization

The calcined spheres-on-sphere particles were packed into a 2.1×50 mm stainless steel column using a synchronic column packing method. The slurry was prepared using 0.3 g of silica particles in 15 ml methanol. The slurry was poured into a 15 ml reservoir and packed at 60K bars.

The columns prepared as above were used for normal phase (NP) testing conditions. The freshly made column was washed with isopropanol (1 hours), then with heptane (1 hour). The NP test mix contained 1-100 µg/ml of toluene, o-nitroaniline, p-nitroaniline and m-nitroaniline in heptane: dioxane (0.7% vv).

For reverse phase (RP) chromatography the column was functionalised by flushing with chloro(dimethyl)octylsilane in toluene. The column was heated at 100° C. for 24 hours. The exact procedure was repeated twice to ensure a good coverage. Finally, the column was washed with toluene (1 hour), acetonitrile (1 hour) and acetonitrile:water (1 hour). The RP test mix, TM-2, contained 1-100 µg/ml of benzamide, acetophenone, benzophenone and biphenyl in water: acetonitrile (50% vv). The RP protein mix contained 2-10 mg/ml of Ribonuclease A, Cytochrome C, lysozyme, Trypsin and BSA in 0.1% vv TFA-water.

Example 8—Normal-Phase (NP) HPLC

The as-prepared spheres-on-sphere particles made using the 5% $NH_3$ solution described above were calcined at 600° C. and the calcined particles were packed into the column by the Example 7 method without further treatment other than being washed with isopropanol (1 hours) and then with heptane (1 hour).

Figure 6:
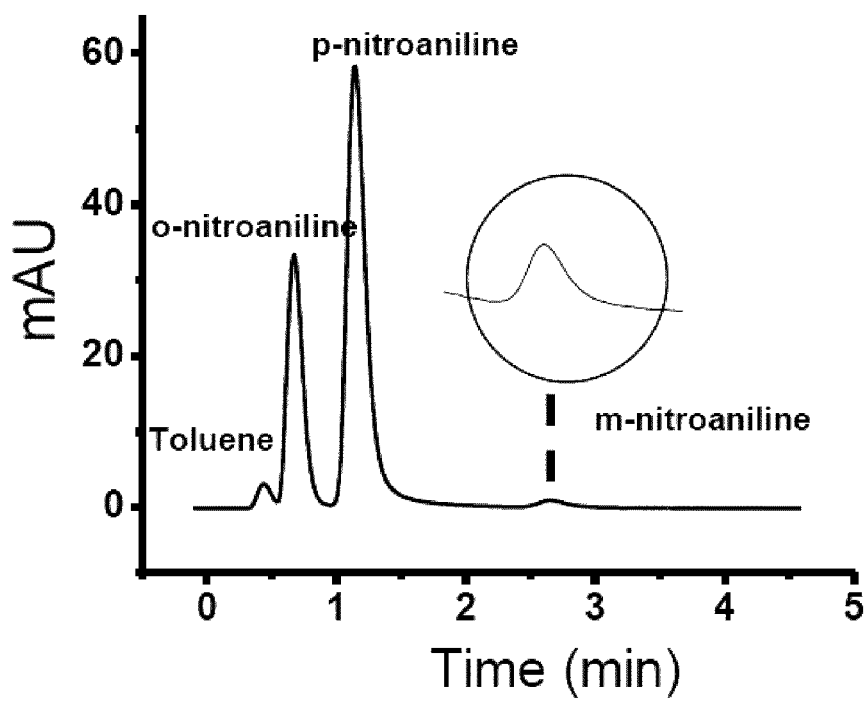
FIG. 6 shows a chromatogram obtained from a column packed with spheres-on-sphere particles according to the present invention using a normal phase test mixture containing 1-100 µg/ml of toluene, o-nitroaniline, p-nitroaniline and m-nitroaniline in heptane:dioxane (0.7% vv) at 0.3 mL/min flow rate.
Figure 7:
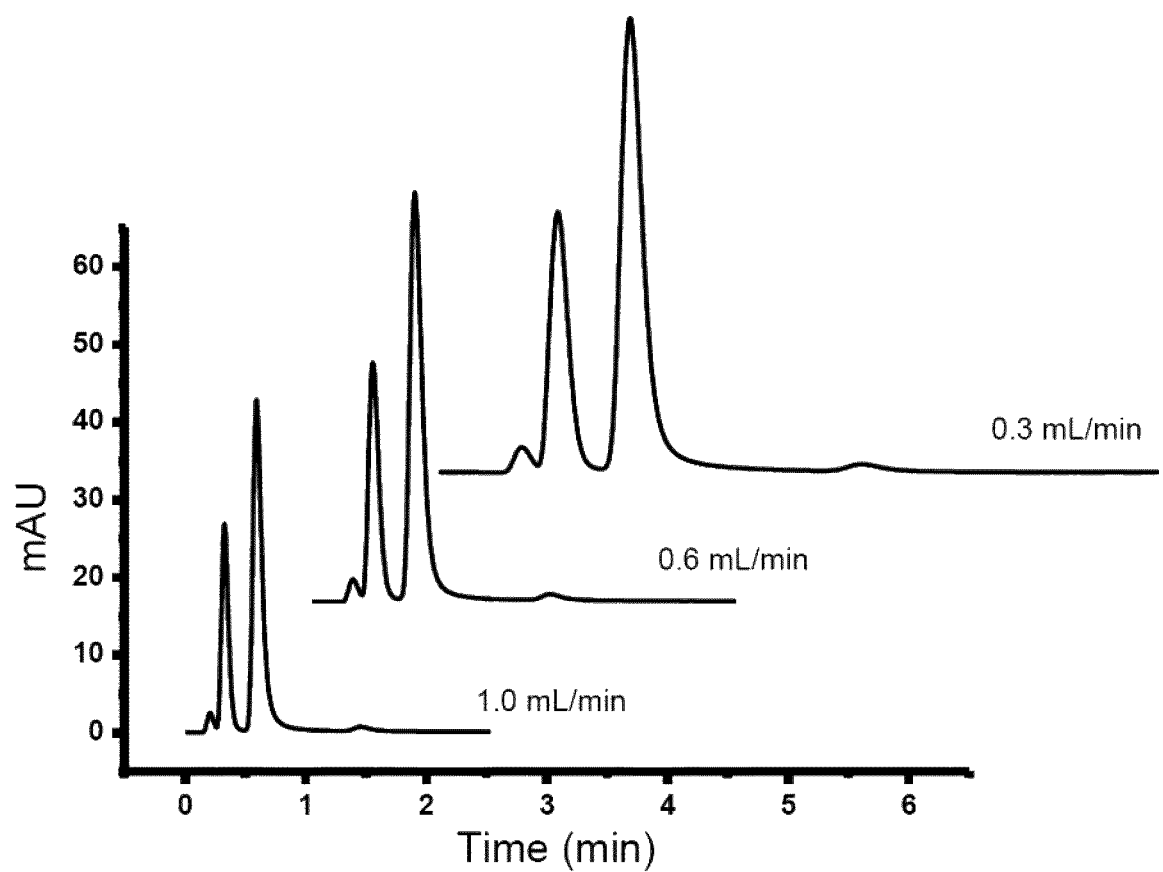
FIG. 7 shows chromatograms obtained in a similar manner to that of FIG. 6 but with higher flow rates.

The column was tested using the NP test mix at 0.3 mL flow rate and with UV detection at 254 nm. FIG. 6 shows the resultant chromatogram. The material exhibited good efficiency of separation of small molecules with plate numbers in the range of 15000-21000 plates/m (p/m) based on m-nitroaniline peak at the optimum flow rate. The efficiency could be further enhanced if the particles were classified to produce a much tighter particle size distribution. The spheres-on-sphere particles were advantageous for rapid diffusion of these analytes with good separation characteristics. The stationary phase produced well resolved peaks even at higher flow rates of 0.6 and 1.0 mL/min as shown in FIG. 7. The analytes were separated within less than two minutes, but there was a slight drop in efficiency and plate numbers of ~9000 p/m were found based on m-nitroaniline peak at 1 mL/min.

Example 9—Reverse-Phase (RP) HPLC

Spheres-on-sphere particles are desirable for reverse-phase separation of bio-macromolecules due to excellent mass transfer characteristics. The column containing the 600° C. calcined material was functionalized with chloro(dimethyl)octylsilane as described above and tested under reverse-phase conditions.

Gradient Elution

Figure 8:
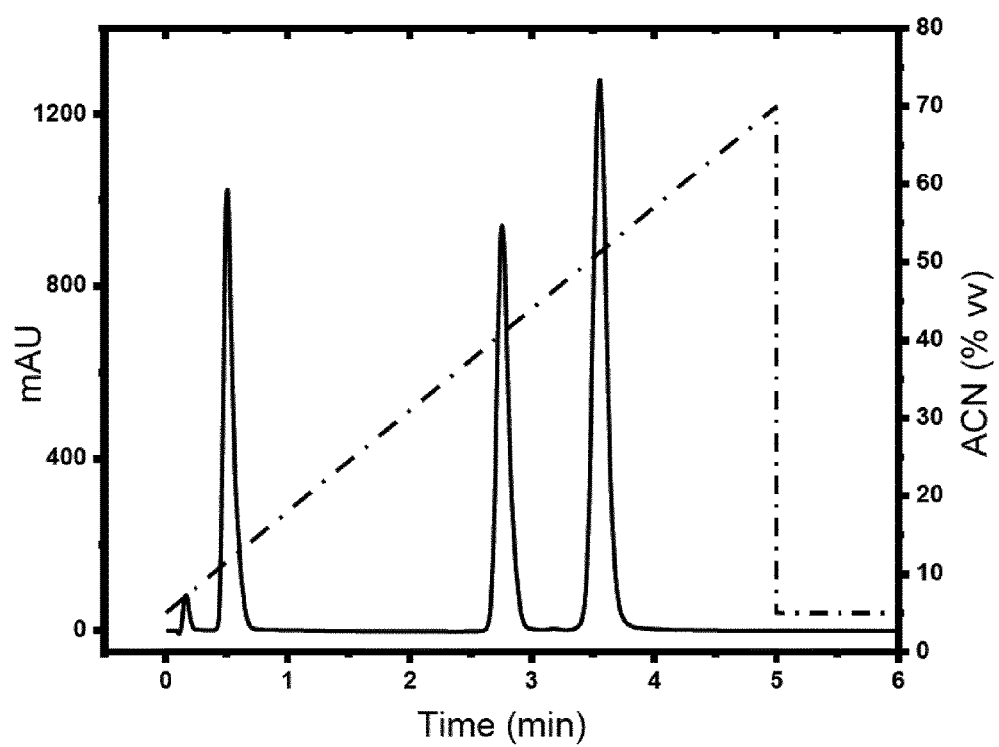
FIG. 8 shows a chromatogram obtained from a column packed with functionalized spheres-on-sphere particles according to the present invention using a reverse phase test mixture, TM-2, containing 1-100 μg/ml of benzamide, acetophenone, benzophenone and biphenyl in water:acetonitrile (50% vv).

The water:acetonitrile mobile phase strength was increased over time during the RP chromatographic separation to achieve faster separation than under isocratic conditions. The analysis of the TM-2 mixture at 1 mL/min and UV detection at 254 nm was performed using a linear solvent gradient with acetonitrile increasing over the range 5-70% vv. The solvent gradient returned to initial conditions after 5 minutes. The peaks were well resolved and the total analysis time was 4 minutes as shown in FIG. 8. The gradient method could be further developed in order to achieve much faster separation time.

Protein Separation

Figure 9:
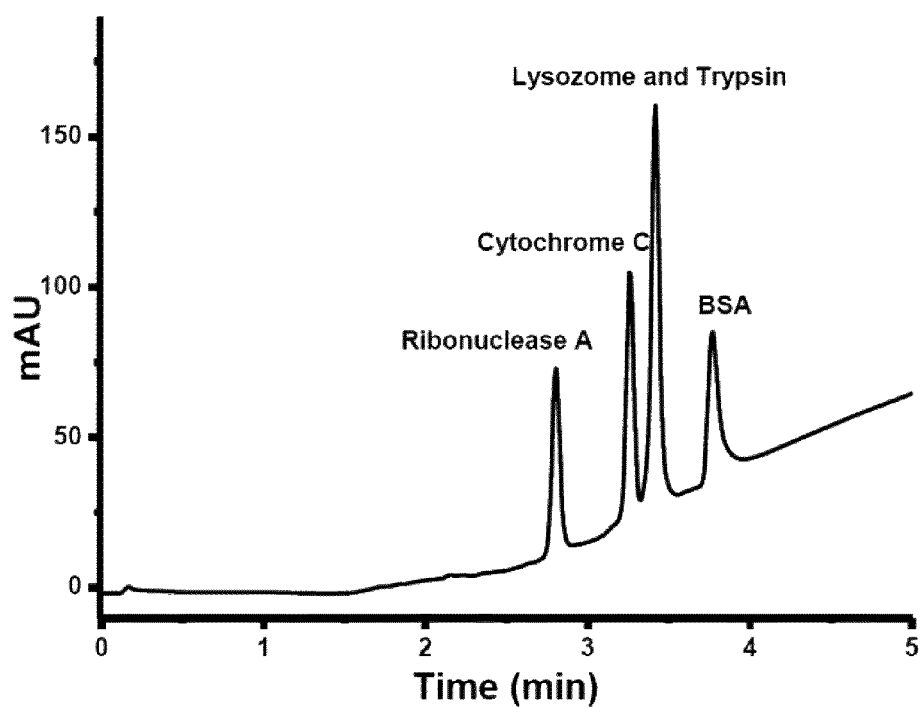
FIG. 9 shows a chromatogram obtained from a column packed with functionalized spheres-on-sphere particles according to the present invention using a reverse phase protein mixture, containing 2-10 mg/ml of Ribonuclease A, Cytochrome C, lysozyme, Trypsin and BSA in 0.1% vv TFA-water.
Figure 10A:
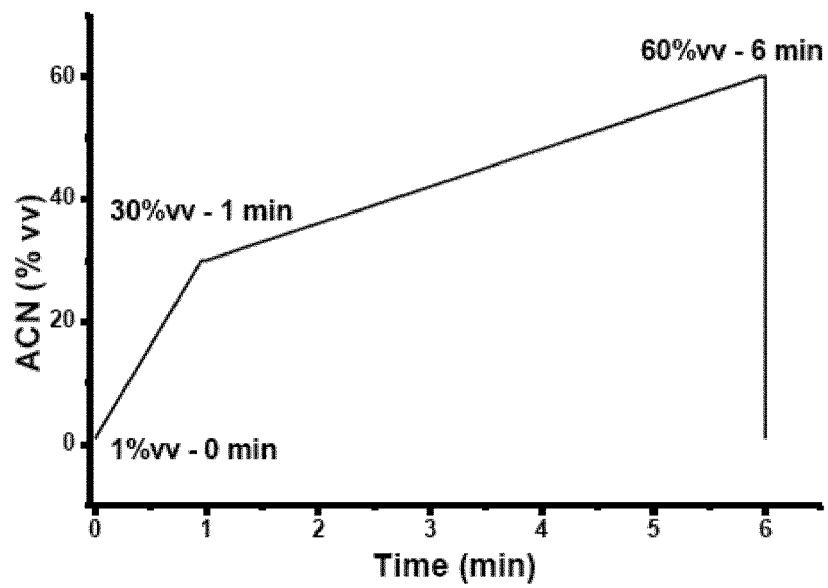
FIG. 10A shows an additional mobile phase gradient profile (Gradient Method 1) and FIG. 10B shows another additional gradient profile (Gradient Method 2) that were each used to obtained chromatograms with the reverse phase protein mixture.
Figure 10B:
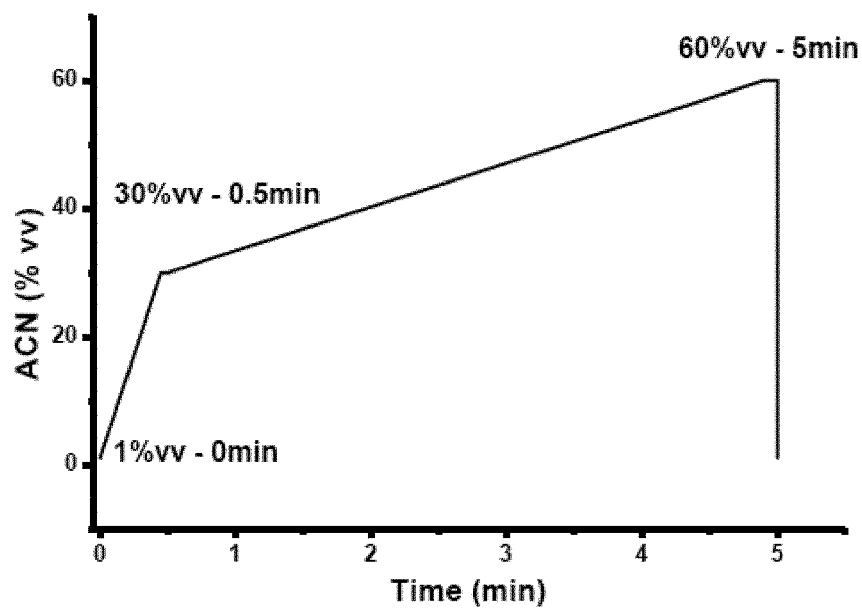

Spheres-on-sphere particles morphology is suitable for the separation of bio-macromolecules. The nanoparticles packed on the surface provide inter-particle pores that permit large molecules to enter the pore structure with faster diffusion distances. A gradient elution study with the protein mix of Ribonuclease A, Cytochrome C, lysozyme, Trypsin and BSA proteins was performed at 25° C. with UV detection at 220 nm. The mobile phase used comprised 0.1% vv TFA-water and 0.1% vv TFA-acetonitrile. Since acetonitrile absorbs at 220 nm a baseline drift was visible. A number of gradient methods were tested in order to achieve the best separation of these proteins. A simple linear gradient method was first set using 5-70% vv acetonitrile 0.1% vv TFA mobile phase at 1 mL/min with a backpressure of 139 bars and a 1 µl injection. Re-equilibration time between each run is important to ensure repeatable separation, thus the column was allowed to equilibrate for 10 minutes before each run. The protein separation using this simple linear gradient is illustrated in FIG. 9. The proteins, which are large macromolecules, were well separated in less than 4 minutes, with excellent peak shapes and resolution. This is due to the excellent kinetic properties of the spheres-on-sphere particles. However, the lysozome and trypsin could not be resolved under these simple linear gradient conditions. Hence, further gradient methods were developed to improve the separation of all five proteins. FIGS. 10A and 10B respectively show further gradient profiles, Gradient Method 1 and Gradient Method 2, used with the same solvent system.

Figure 11:
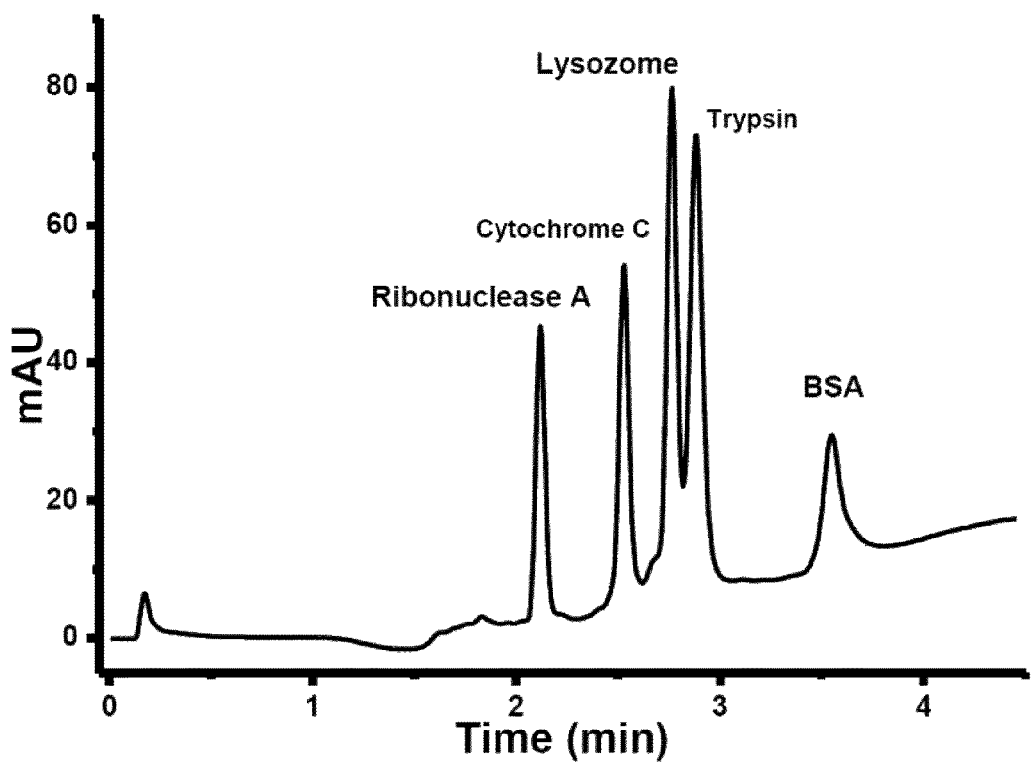
FIG. 11 shows a chromatogram of the reverse phase protein mixture obtained using the Gradient Method 1.
Figure 12:
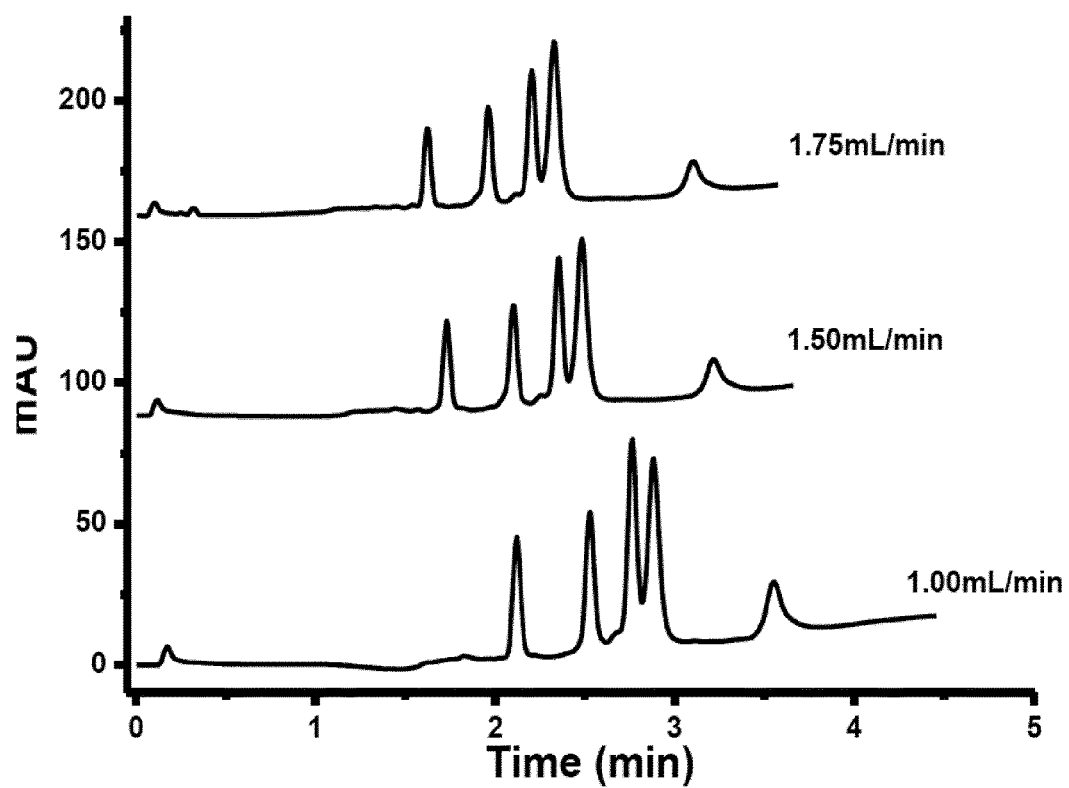
FIG. 12 shows chromatograms of the reverse phase protein mixture obtained using different flow rates and using Gradient Method 1.
Figure 13:
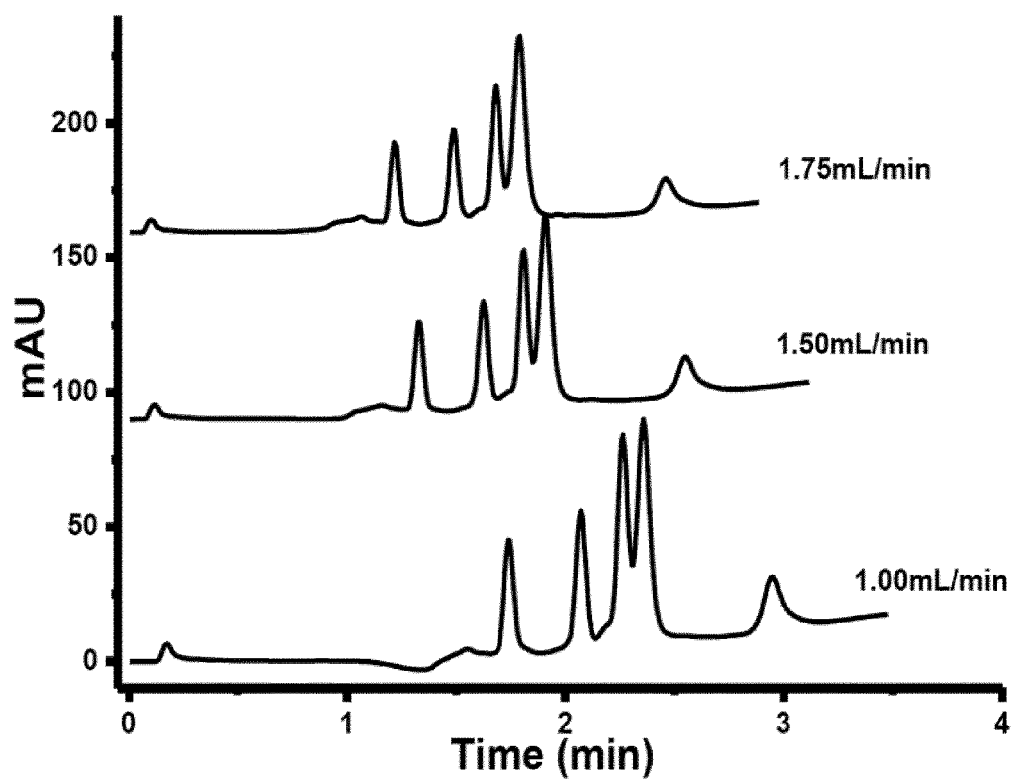
FIG. 13 shows chromatograms of the reverse phase protein mixture obtained using different flow rates and using Gradient Method 2.

The gradient profiles Gradient Method 1 and Gradient Method 2 showed a good separation of the protein mixture at 1 ml/min (see FIG. 11 for Gradient Method 1). All five proteins were fully resolved within 4 minutes (Gradient Method 1) and 3 minutes (Gradient Method 2). The resolution was maintained for each peak with excellent peak shapes. However, there was some loss of resolution between lysozome and trypsin caused by the faster elution of these proteins under Gradient Method 2. Higher flow rates were also tested under these gradient conditions. Because of the excellent kinetic properties of the spheres-on-sphere particles, even faster separations of such compounds are possible at higher mobile phase velocities (e.g. flow rates such as 1.5 and 1.75 ml/min). The results of the separations at the different flow rates are shown in FIG. 12 for Gradient Method 1 and in FIG. 13 for Gradient Method 2. As shown in FIGS. 12 and 13, the separation of proteins at 1.75 ml/min was completed in about 3.5 minutes (Gradient Method 1) and 2.5 minutes (Gradient Method 2) respectively. Again, resolution was maintained with good peak shapes. The back pressure of the column increased to 189 bars at 1.5 ml/min and 241 bars at 1.75 ml/min, well within the operating range of the HPLC system.

Figure 14:
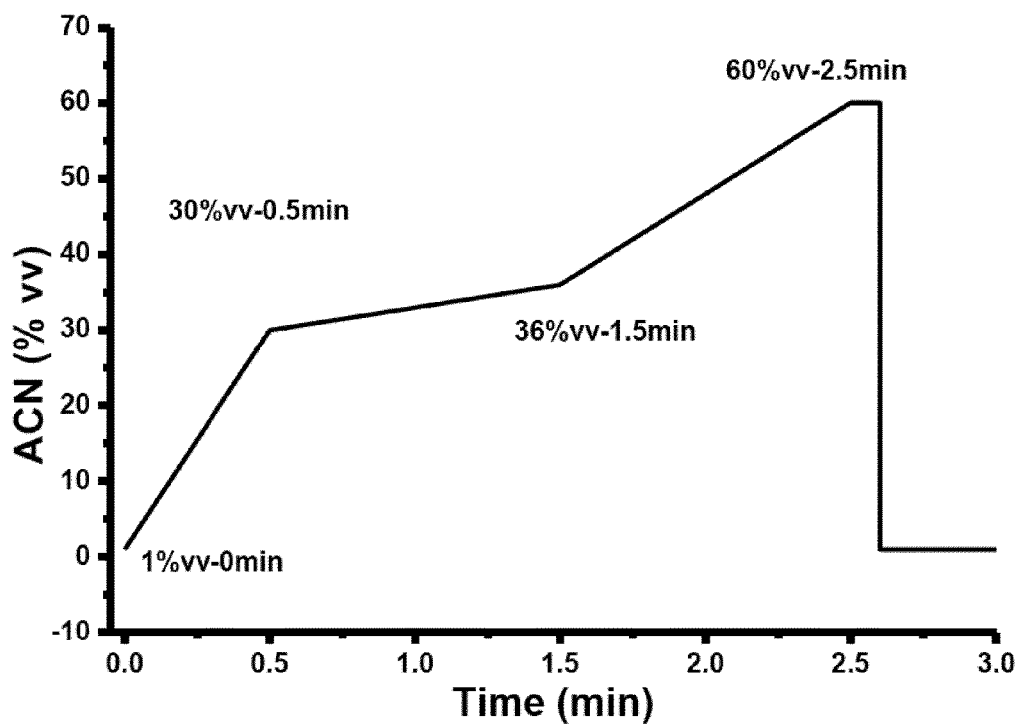
FIG. 14 shows a further optimised gradient profile (Gradient Method 3) used to obtained chromatograms with the reverse phase protein mixture.
Figure 15:
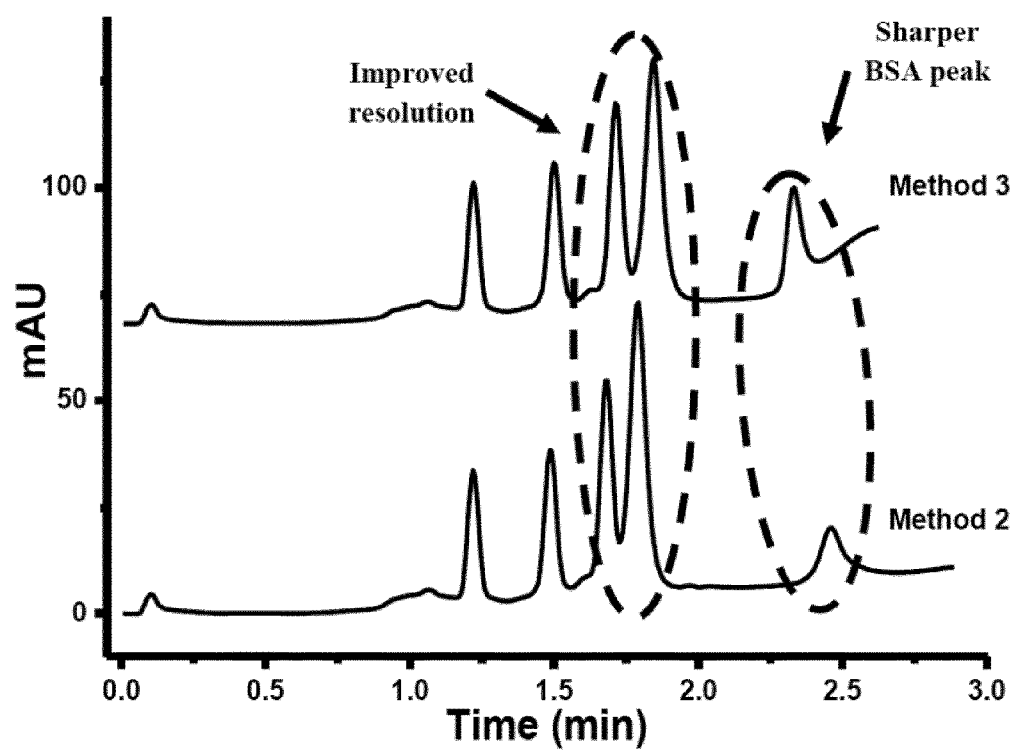
FIG. 15 shows a comparison of chromatograms obtained using Gradient Method 3 (top trace) and gradient Method 2 (bottom trace).

FIG. 14 shows a further optimised gradient profile that was used (Gradient Method 3). From the chromatogram using this mobile phase gradient, the BSA peak was much sharper and was slightly shifted as shown in FIG. 15 (top trace) compared to Gradient Method 2 (bottom trace). Gradient Method 3 effectively improved the separation of lysozome and trypsin peaks. Hence, depending on the gradient applied during separation, the peaks can easily be accelerated through the column or delayed in the column. In any case, the spheres-on-sphere particles demonstrated the ability to rapidly separate higher-molecular mass compounds such as proteins.

Figure 16:
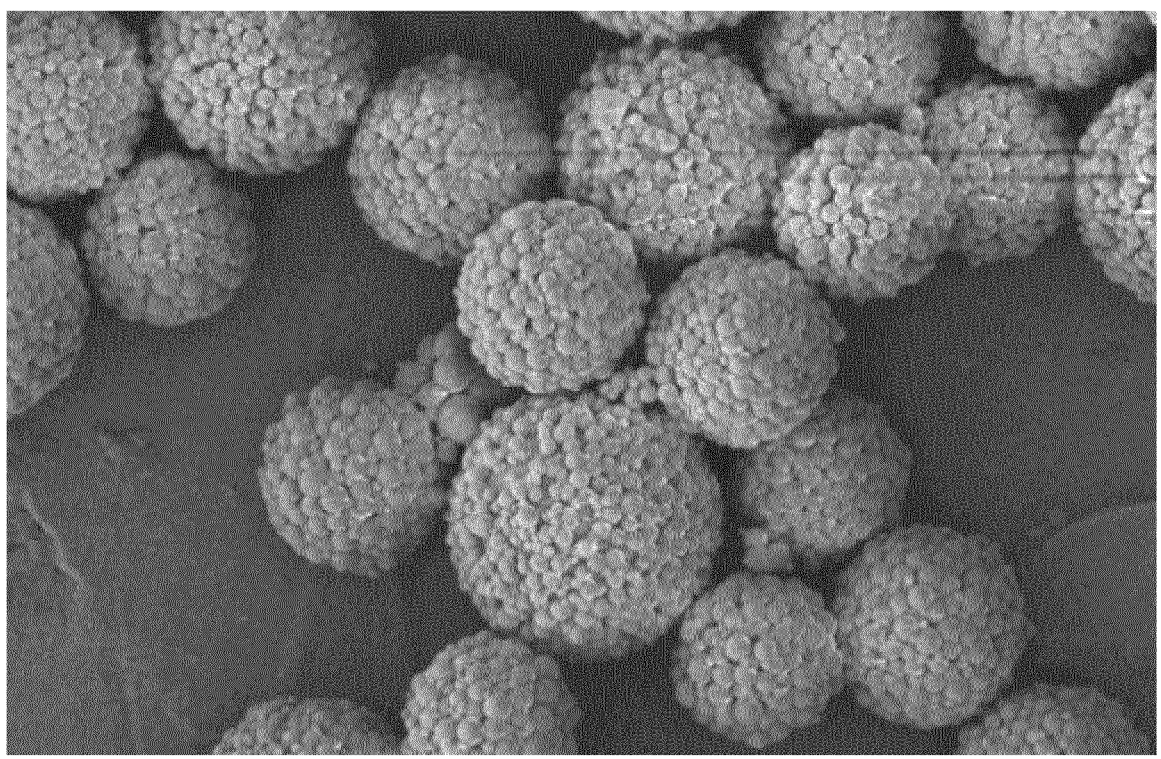
FIG. 16 shows an SEM image of unpacked spheres-on-sphere silica material according to the present invention after performing chromatographic separations.

After completing the chromatographic testing, the column bed had not changed and no void was observed after the column was unpacked and the morphology was observed by SEM. The SEM image in FIG. 16 shows the unpacked spheres-on-sphere silica-C8 material with the spheres-onsphere morphology retained. This suggests that the nanoparticles are strongly attached to the surface of the microparticles.

As used herein, including in the claims, unless the context indicates otherwise, singular forms of the terms herein are to be construed as including the plural form and vice versa. For instance, unless the context indicates otherwise, a singular reference, such as "a" or "an" means "one or more".

Throughout the description and claims of this specification, the words "comprise", "including", "having" and "contain" and variations of the words, for example "comprising" and "comprises" etc, mean "including but not limited to", and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

The use of any and all examples, or exemplary language ("for instance", "such as", "for example", "e.g." and like language) provided herein, is intended merely to better illustrate the invention and does not indicate a limitation on the scope of the invention unless otherwise claimed. No language in the specification should be construed as indicating any non-claimed element as essential to the practice of the invention.

Any steps described in this specification may be performed in any order or simultaneously unless stated or the context requires otherwise.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

The invention claimed is:

1. A process for making superficially porous silica particles, the process comprising,
   in a basic medium that comprises water and an organic solvent,
   in the presence of a hydrophilic polymer acting as a colloid stabilizer and in the presence of a surfactant, hydrolyzing and condensing a silica precursor comprising a functional group selected from mercapto, amino, hydroxyl and epoxy, to form superficially porous silica particles,
   the superficially porous silica particles comprising substantially non-porous silica microparticles having silica nanoparticles bound to the surface of the microparticles,
   wherein hydrolyzing and condensing the silica precursor is performed as a one-pot synthesis and comprises forming the microparticles first, followed by controlled growth of the surface-bound nanoparticles on the surface of the microparticles.

2. The process according to claim 1 wherein the functional group is a mercapto group.

3. The process according to claim 2 wherein the precursor comprises a mercapto-silane.

4. The process according to claim 3 wherein the mercapto-silane comprises 3-mercapto-propyl-trimethoxy-silane or 3-mercapto-propyl-triethoxy-silane.

5. The process according to according to claim 1 wherein the silica precursor is used as a sole silica source.

6. The process according to according to claim 1 wherein the basic medium has a starting pH in the range 9 to 11.

7. The process according to claim 1 wherein the organic solvent comprises methanol.

8. The process according to claim 1 wherein the surfactant comprises a quaternary ammonium surfactant.

9. The process according to claim 8 wherein the quaternary ammonium surfactant comprises cetyltrimethylammonium bromide (CTAB) or cetyltrimethylammonium chloride (CTAC).

10. The process according to claim 1 wherein the hydrophilic polymer comprises poly(vinyl alcohol) (PVA) or poly(vinyl pyrrolidone) (PVP).

11. The process according to claim 1 further comprising calcining the superficially porous silica particles.

12. The process according to claim 1 wherein the microparticles have an average particle size as measured by laser diffraction in the range 1 μm to 20 μm.

13. The process according to claim 1 wherein the nanoparticles have an average particle size measured by dynamic laser scattering (DLS) of not greater than 500 nm.

14. The process according to claim 1 wherein a pore size of the superficially porous particles calculated by non-local density functional theory (DFT) is less than 2 nm.

15. The process according to claim 1 wherein the nanoparticles bound to the surface of the microparticles form a monolayer.

16. The process according to claim 1 wherein the microparticles have an average particle size as measured by laser diffraction in the range 1 μm to 10 μm.

17. The process according to claim 1 wherein the hydrophilic polymer and surfactant are included in and mixed with the basic medium, followed by adding the silica precursor to the basic medium and stirring the reaction ingredients during the hydrolysis and condensation.

18. The process according to claim 17 wherein a duration of the hydrolyzing and condensing is least 30 minutes as measured from a start of the adding the silica precursor to the basic medium.

* * * * *

UNITED STATES PATENT AND TRADEMARK OFFICE
CERTIFICATE OF CORRECTION

PATENT NO. : 10,493,428 B2  
APPLICATION NO. : 14/361768  
DATED : December 3, 2019  
INVENTOR(S) : Ritchie et al.

Page 1 of 1

It is certified that error appears in the above-identified patent and that said Letters Patent is hereby corrected as shown below:

In the Claims

Claim 5, Column 18, Line 13: replace "according to according to" with --according to--

Claim 6, Column 18, Line 15: replace "according to according to" with --according to--

Claim 18, Column 18, Line 55: insert --at-- after "is"

Signed and Sealed this  
Thirty-first Day of March, 2020

Andrei Iancu  
*Director of the United States Patent and Trademark Office*